April 10, 1951 C. G. MONTGOMERY 2,547,960
PRESELECTION TIME CONTROL DEVICE
Filed Nov. 6, 1947 4 Sheets-Sheet 1
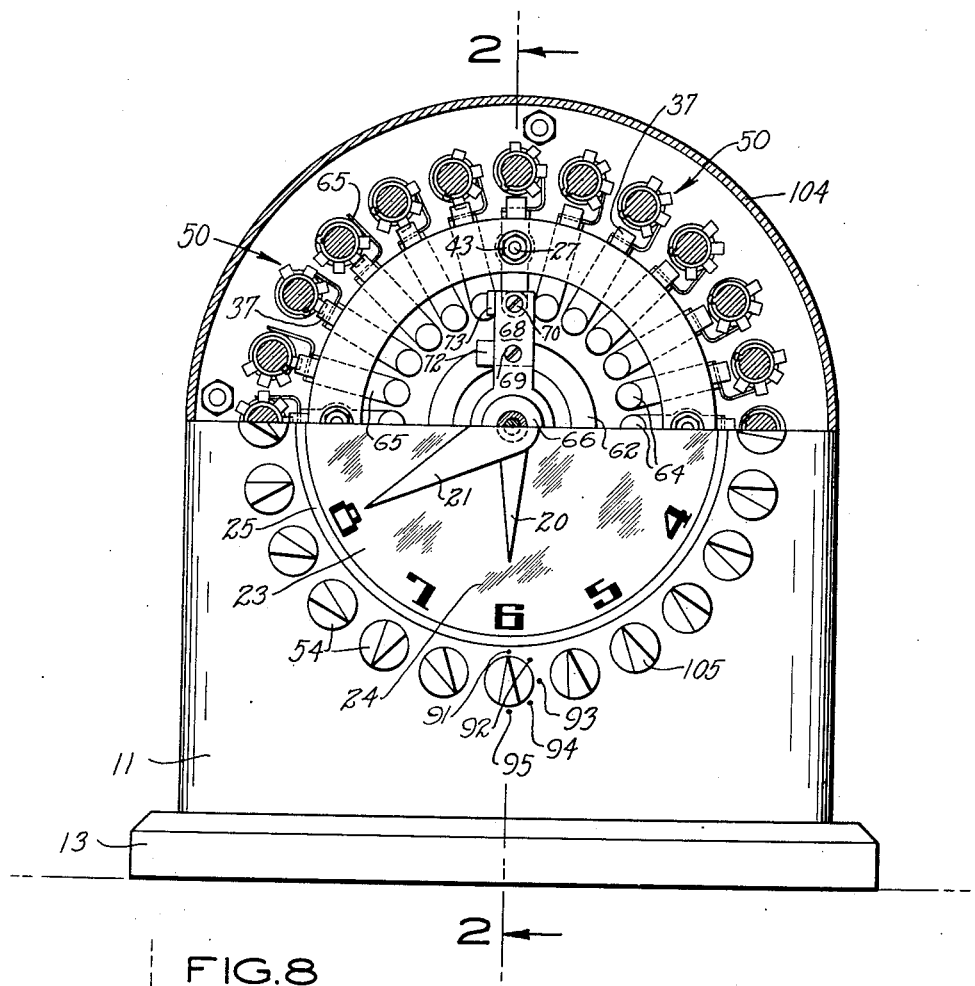
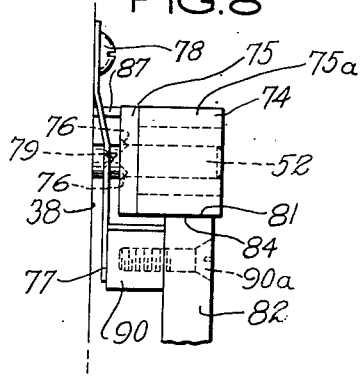
INVENTOR
C.G. MONTGOMERY
BY Isaac Jordan Kunik
ATTORNEY April 10, 1951 C. G. MONTGOMERY 2,547,960
PRESELECTION TIME CONTROL DEVICE
Filed Nov. 6, 1947 4 Sheets-Sheet 2

INVENTOR
C. G. MONTGOMERY
BY Isaac Jordan Kunik
ATTORNEY

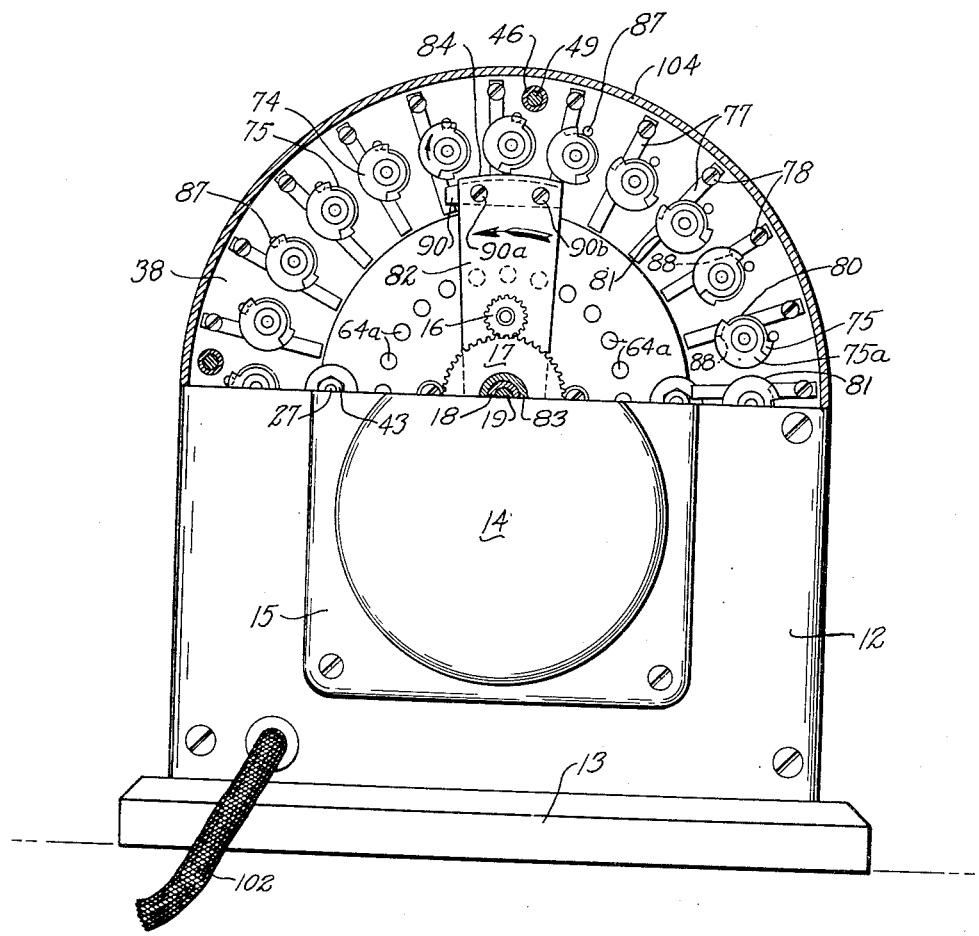

April 10, 1951  C. G. MONTGOMERY  2,547,960
PRESELECTION TIME CONTROL DEVICE
Filed Nov. 6, 1947  4 Sheets-Sheet 4
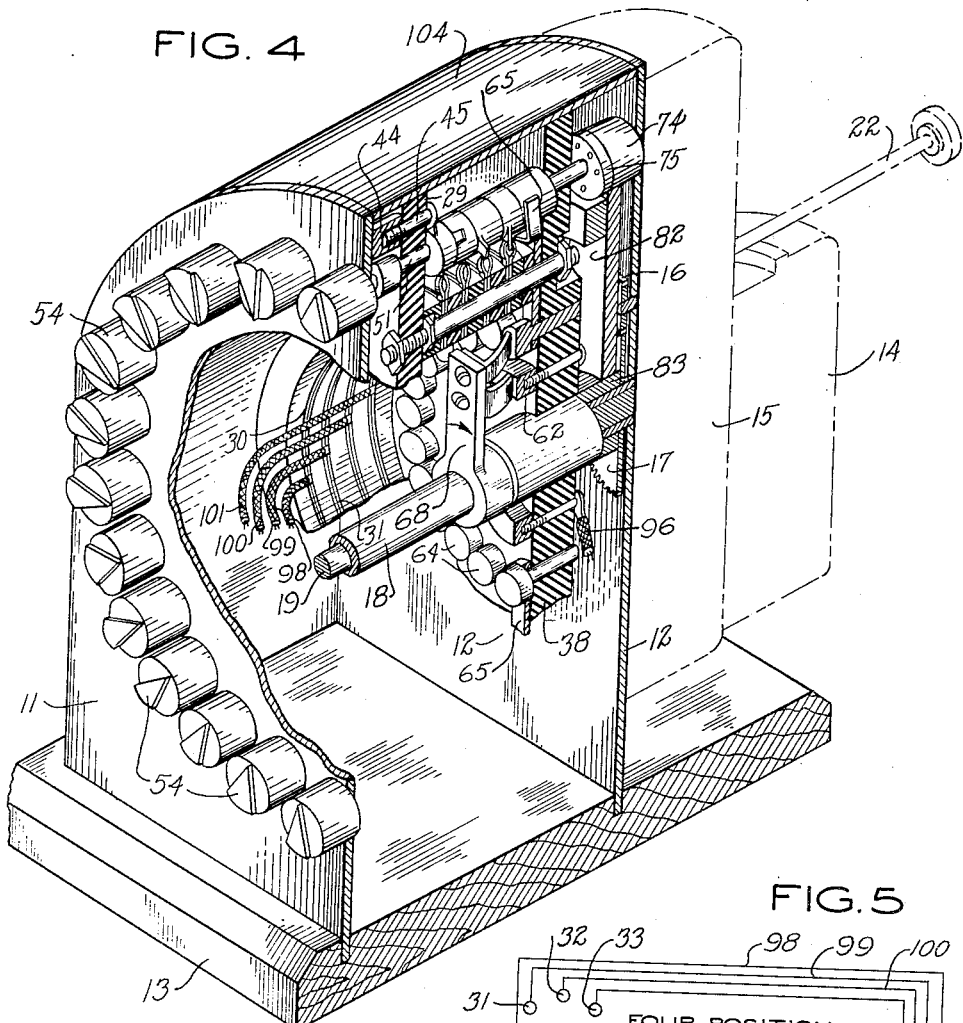
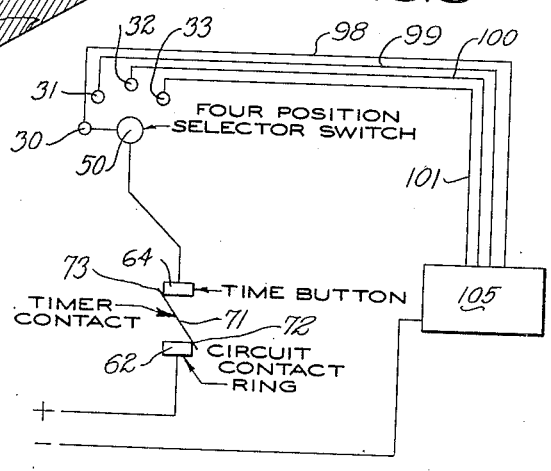
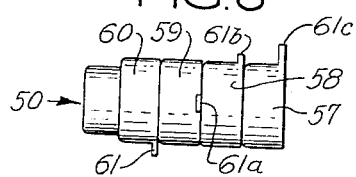
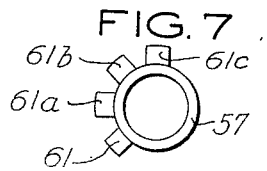
INVENTOR
C. G. MONTGOMERY
BY Isaac Jordan Kunik
ATTORNEY Patented Apr. 10, 1951

2,547,960

UNITED STATES PATENT OFFICE 2,547,960

PRESELECTION TIME CONTROL DEVICE

Clarence Graham Montgomery,
North Granby, Conn.

Application November 6, 1947, Serial No. 784,420

23 Claims. (Cl. 161—1)

This invention relates to improvements in time control switches and more particularly to an improved preselection switch which is capable of operating controllable equipment in accordance with a predetermined program.

An object of this invention is to provide a preselection switch which is of simple construction, economical to manufacture and which is readily adaptable to control various electrical circuits in time period sequences.

Another object of the invention is to provide a preselection switch by means of which is controlled the selection of particular electrical circuits, the successive selection of said circuits, the duration of time of selection of said circuits and the termination of the selection of said circuits.

A further object of the invention is to provide an improved time-controlled preselection device for use with controllable apparatus of various types.

A still further object of the invention is to provide a time-controlled preselector device in a compact rugged form which is extremely flexible in adaptation and efficient in operation.

Another object of the present invention is to provide an improved preselector adapted to set into operation a plurality of sequential functions over pre-determined periods of time in accordance with a more or less prolonged program.

Another object of this invention is to provide a preselector device adapted quickly and simply to set up a comprehensive program of operations over a prolonged period of time, and yet be compact in size, and simple in structure for low-cost, high quality production.

Another object of the present invention is to provide a preselector device adapted to set in operation a plurality of functions, several of said functions being simultaneous and other of said functions being sequential over predetermined periods of time in accordance with a more or less prolonged period of time.

Other objects of the invention will be apparent from the following description and accompanying drawings taken in connection with the appended claims. However, I desire to have it distinctly understood that I do not intend to limit myself to the exact details shown or described, but that I intend to include as part of my invention all such obvious changes and modifications of parts as would occur to a person skilled in this art, and as would fall within the scope of the claims.

For a fuller understanding of the nature and objects of the invention as well as for the specific fulfillment thereof, reference should be had to the following detailed description taken in connection with the accompanying drawings, in which:

Figure 1 is a face view of the preselection switch device of the present invention with the clock face partly broken away to show a part elevation of the internal detail of said device, said Figure 1 being taken on line 1—1 of Figure 2;

Figure 3 is a back view of the preselection switch partly broken away to show a part elevation of the shut off mechanism, taken on line 3—3 of Figure 2;

Figure 4 is a perspective isometric view partly in cross-section, of part of the internal detail of the preselection switch taken on line 2—2 of Figure 1;

Figure 5 is a schematic equivalent circuit diagram of the preselection switch;

Figure 6 is an enlarged side view of one form of selector assembly;

Figure 7 is an enlarged end view of said selector assembly;

Figure 8 is an enlarged detail elevation of one form of shut-off mechanism for the selector assemblies.

Figure 2:
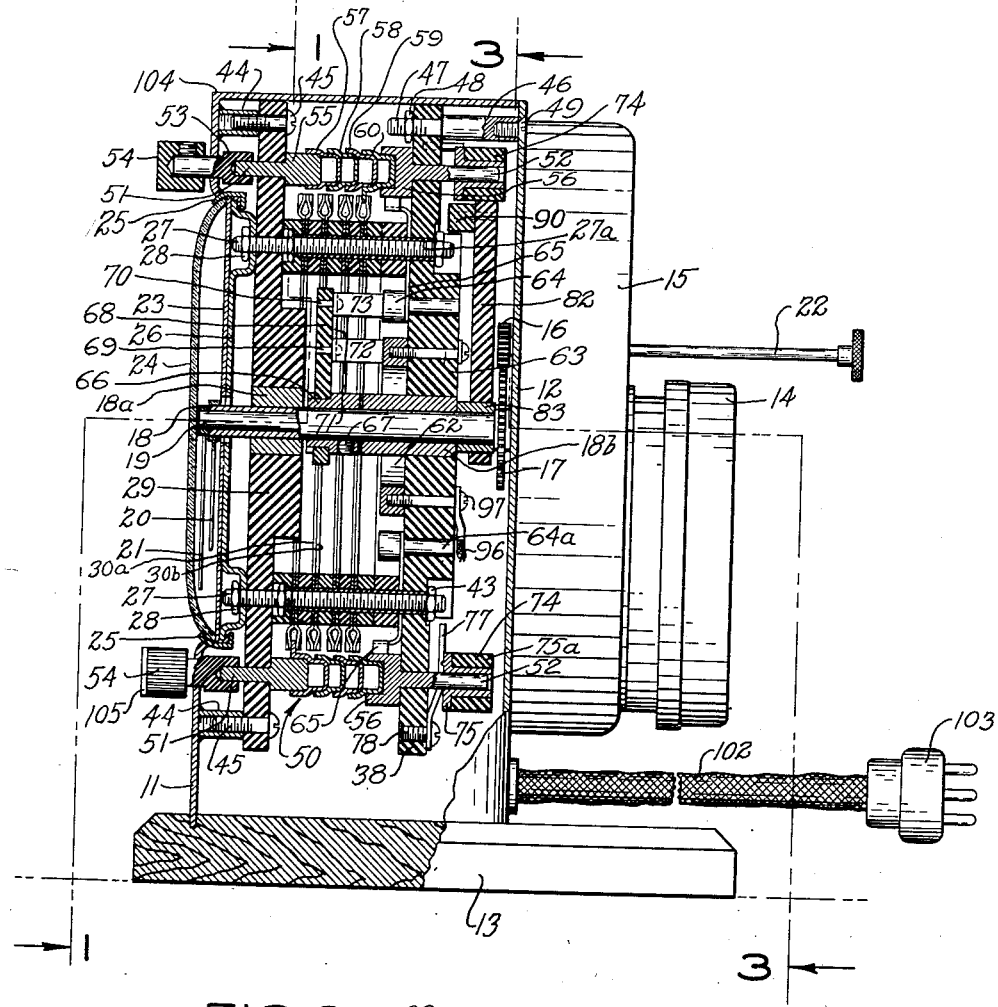
Figure 2 is a detail cross-section view of the preselection switch device taken on line 2—2 of Figure 1.

In practicing my invention, I provide a preselector mechanism having in combination, a series of preselector switches, each of which is adapted to select one or more of a plurality of electrical circuits, a time drive mechanism, a series of stationary circuits arranged within the cage-like formation of the preselector switches, a contact arm coordinated with the time drive mechanism which successively throws into circuit the various preselector switches and a shut off arm, if desired, coordinated with the time device and adapted to switch off each of the pre-selector switches in sequence when the time cycle for each preselector switch has elapsed. The device of the present invention provides for setting up a program of predetermined events which may be established in advance by setting a series of switch means which are adapted to control a multiplicity of electrical or electronic circuits. The selected circuits perform their functions in a predetermined sequence according as time advances as controlled by a timer device or clock. The device of the present invention provides for a hitherto unachieved flexibility of choice of circuits or functions and accomplishes this result in a simple and efficient manner. The present device is characterized by ease of operation, simplicity of structure and economy of manufacture.

The preselector switch apparatus is built in conjunction with a timing device and supported upon plates 11 and 12 set into base 13. The clock or timing device may be mechanical or electrical but I prefer to employ a hysteresis type synchronous motor for power actuation, as represented by box 14. Power from the motor 14 is transmitted through conventional gearing as represented by gear box 15, and through gears 16 and 17 to coaxial shafts 18 and 19. Shaft or arbor 18 revolves within sleeves 18a and 18b. Shaft 18 which rotates at one revolution per twelve hours controls clock hour hand 20, and shaft 19 which rotates once every hour controls minutes hand 21. Pin 22 attached to gear 16 permits manual setting of the clock hands. The motor 14 and gear box 15 are mounted on the rear mounting plate 12. The dial face plate 23 and hands 20 and 21 are covered by transparent lens 24 which is held by retainer ring 25 to dial face plate 23 and dial mounting plate 26. The assembly of lens 24, dial 23, plate 26 and retainer ring 25 are fastened by means of studs 27 and nuts 28 to the front insulating plate 29. Studs 27 are surrounded by insulating sleeves 27a.

Figure 9:
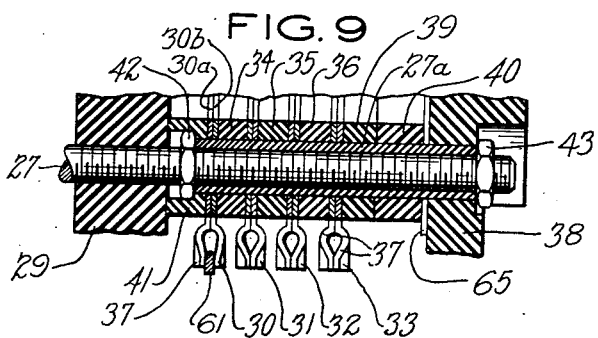
Figure 9 is an enlarged detail cross-section of part of the assembly of circuit rings and their corresponding contact clips.

As seen in the cross-section detail of Figure 2 taken on line 2—2 of Figure 1 and in enlarged detail in Figure 9, the essential circuits of the present invention are embraced in an assembly of several electrically conducting circuit ring discs 30, 31, 32, and 33 which are arranged in tandem and separated from each other by insulator ring discs 34, 35, 36. The circuit ring discs are each made of two contiguous ring disks 30a and 30b pressed together to form one conducting unit. Each individual circuit ring disc such as 30a and 30b has contact lips 37 positioned opposite each other, the combination of said lips forming a spring contact. Said sets of spring contact clamps or clips 37 are spaced at regular intervals around the circumference of said circuit ring disks 30, 31, 32 and 33 as shown in Figure 1.

The circuit rings 30, 31, 32 and 33 and insulator rings 34, 35 and 36 are separated from rear insulator plate 38 by insulator ring discs 39 and 40, and are separated from front insulator plate 29 by insulator ring disc 41. The assembly of said conducting circuit rings and said insulating rings is fastened between insulator plates 29 and 38 by means of studs 27 and nuts 28, 42 and 43. The assembly of said circuit rings and insulating rings is preferably positioned concentrically around arbor or shaft 18.

Front insulator plate 29 is attached to front mounting plate 11 by means of bushings 44 and screws 45, while rear insulator plate 38 is attached to the rear mounting plate 12 by means of bushing 46, bolt 47, nuts 48 and screw 49.

Also assembled between front plate 29 and back plate 38 and disposed in a circle around shaft 18 are a plurality of rotatable multiposition selector elements or switch assemblies 50 which are mounted on shafts 51 and 52 which rotatably protrude through bearing holes in said plates 29 and 38. Attached to shaft 51 is an insulating stud 53 upon which is attached a knob 54. Shaft 51 broadens into an arbor 55 while shaft 52 broadens into an arbor 56. Between arbors 55 and 56 is press-fitted and assembled a series of selector cups 57, 58, 59 and 60 which are rotatable in coordination with the rotation of shafts 51 and 52. Each of said selector cups 57, 58, 59 and 60 has a selector contact lip 61 which, when knob 54 is rotated, is brought into contact with spring contact clip 37 of circuit ring 30, for example, as shown in the lower selector assembly in Figure 2. The respective selector lips 61, 61a, 61b, and 61c (see Figures 6 and 7) of cups 57, 58, 59 and 60 are arranged radially and longitudinally upon the axis of the assembly of said cups so that each selector lip is 45° removed from the next adjacent selector lip. In this manner, as the knob 54 is rotated 180° four separate and successive contacts are made between the selector lips and the circuit rings. By rotating knob 54, a selection of four separate circuits can be made. The selector cups 57, 58, 59 and 60 as well as the circuit rings 30, 31, 32 and 33 are made of electrically conductive metal. If only one circuit ring is employed then only one selector lip is required on the selector switch.

As seen in detail in Figure 1 a circuit contact ring 62 of electrically conductive metal is fastened on back plate 38 by means of screws 63. Also on said back plate are fastened time contact buttons 64 of electrically conductive metal which are fastened by studs 64a to back plate 38. Attached to shaft 18 is a sleeve 66 which is set by screw 67 and to which is attached sweep arm 68 of insulating material which makes one revolution per 12 hours in coordination with the hour hand 20 of the clock. Attached to arm 68 by means of studs 69 and 70 is a Phosphor bronze timer contact plate 71 having brushes or legs 72 and 73. Brush 72 of said timer contact plate maintains constant contact with the circuit contact ring 62, while the sweep arm 68 rotates around arbor 18. The second snap-action brush contact member 73 is also carried by sweep arm 68 and successively sweeps across buttons 64 in a clock-wise manner.

Each contact time button 64 is connected with each selector cup assembly 50 by way of metal strip connectors 65 which brush arbor 56 of shaft 52.

Attached to shafts 52 are shut off knobs 74 which have several indexing recesses 76 on face 75 as shown in Figure 8 which are arranged radially at 45° angles from each other. Indexing spring blades 77 attached to plate 38 by screw 78, having an extruded bead 79, operate to fit into indexing recesses 76 and yieldably cooperate with said recesses to fix the selector switch in desired positions so that at each position a selector lip 61 is in contact with the spring clip 37 of its corresponding circuit ring. As the selector knob is turned 45° a selector lip leaves its contacting position and another lip moves into contacting position. Indexing spring 77 tends to stabilize the positioning of the selector lip 61 with the spring contact clip 37 of the circuit ring. Indexing recesses may alternatively be cut into surface of the shaft on which knob 74 is fastened and indexing spring means may be arranged to cooperate yieldably with said recesses. Said indexing means may also comprise a yieldable ball in socket arrangement to cooperate with the indexing recesses.

Each shut-off knob 74 is formed of a metal member 75 upon which is fastened an insulating member 75a, to form an integral knob. As shown in greater detail in Figure 3 the metal portion 75 has a recessed edge 80, and the rubber portion 75a has a cam edge 81.

The shut-off member 82 of insulating material is attached to sleeve 83 which is fitted on shaft 18, and makes one revolution each 12 hours. Said shut off sweep arm 82 is positioned upon the shaft 18 so that it follows the contact sweep arm 68 to turn off a switch a short time after the snap action brush 73 has contacted the next switch in the time sequence. The turning of each selector assembly to the off or open circuit position is accomplished by the circumferential edge 84 of the sweep arm 82 forcing against the circumferential edge 81 of the part 75a of knob 74, the friction created thereby being sufficient to rotate said knob and consequently the switch lip contacts. The circumferential edge 84 may be made of any resilient but firm material which is adapted to grip frictionally the shut-off knob 74. Said edge 84 may be made of hard, soft or sponge rubber or plastic. Alternatively edge 84 and edge 81 may be knurled so that a gripping and consequent turning of the knob 74 takes place when arm 82 makes its rotation.

When the sweep arm 82 operates the knob 74 said knob is permitted to rotate by virtue of the recessed edge 80 of the metal member 75 traveling past stationary stop-pin 87. When the selector switch reaches the off or open circuit position the intended surface 88 of the member 75 butts up against said pin 87 and stops the rotation of the switch. The edge 81 of knob 74 is cut in such a manner that when the knob reaches the off position the sweep arm 82 is enabled to pass said knob without touching it. In Figure 3 the shut-off arm 87 is shown approaching a quadrant of shut-off knobs that are in the off or open circuit position, and hence will not be touched by said shut-off member. As the shut-off member 82 makes its revolution it will reach the fourth quadrant of shut-off knobs 74 which indicate that their corresponding selector switches are in various closed circuit positions. The cam edges 81 of said shut-off knobs are in such a position that they are in the operative path of cam edge 84 of arm 82. The friction between cam edges 84 and 81 operates to turn knobs 74 and their corresponding selector switches to the open circuit position. Thus means are provided for returning the selector switches to the off-position after the functioning time for a selected circuit has elapsed.

When the shut off arm 82 approaches to turn the shut off knobs 74, a cam 90 which is attached to said arm by screws 90a and 90b pushes dent 79 of spring blade 77 away from the indexing grooves of recesses 76 in the knob 75 thus reducing the amount of friction required to rotate the selector switch 50. The forward edge of said cam 90 leads the forward edge of the sweep arm 82 so that the indexing spring blade 77 is depressed before the rotating action takes place.

The shut off means may alternatively comprise a toggle arm which is fastened to selector switch 50 and which is thrown or pushed by sweep arm 82 to rotate said switch to the off-position. Also a gear arrangement can be made whereby a gear cam is attached either to arbor 83 or to sweep arm 82, said gear cooperating with a gear cam on the shaft of the selector switch 50 to rotate said switch.

The selector knobs 54 on the face of the front mounting plate 11 are shown in the off position in the second quadrant of the circle of knobs, Figure 1. In the broken away elevation view the selector contact assemblies in the first quadrant are shown in the off position. In the third quadrant the selector knobs represent various contact positions, while the selector assemblies in the fourth quadrant are also in various contact positions. The selector knob 54 adjacent the numeral 6 on the clock face has a series of index dots 91, 92, 93, 94 and 95 surrounding it and to which pointer 105 may be turned. Dot 91 represents the off position and dots 92, 93, 94 and 95 represent the successive circuit contact positions corresponding to the respective lip contacts 61, 61a, 61b and 61c in contact with respective circuit contact clips 37. The indicator index dots 91, 92, 93, 94 and 95 may be repeated if desired around each of the selector buttons.

Figure 6 is an enlarged plan view of the selector cups 57, 58, 59 and 60 which are press-fitted to each other. Each cup has a contact lip 61, 61a, 61b and 61c, respectively as shown in end view of Figure 7 looking at the right end of Figure 6. In Figures 1, 2 and 4, the circuit of the present preselection device is traced by leading current from a power line by way of wire 96 (broken off in Figures 2 and 4) which is fastened by screw 97 which is electrically connected to circuit contact ring 62. Current traveling around said ring 62 follows brush 72 to plate 71 on the sweep arm 68. The current then follows snap-action brush 73 which contacts successively each of the time contact buttons 64. Current then passes through connector 65 which is bent in such a manner as to wipe arbor 56. Said arbor 56 is in electrical connection with selector cup 60. When the selector cup assembly 50 is turned by selector knob 54 a selector contact lip 61, etc. is brought into contact with its respective circuit ring 30, 31, 32 or 33. To each circuit ring is connected insulated lead wires 98, 99, 100 and 101 which are collected and led into a cable 102 which is passed through the rear mounting plate 12. Said cable 102 may terminate in a plug 103 which can be connected with whatever industrial or domestic electrical or electronic device it is desired to control. The whole assembly of the present device is covered by plate 104. Each of the circuit rings 30, 31, 32 and 33 is connected with a circuit which it is desired to control. The selection of the desired circuit is accomplished by the operation of the selector switch 50 which by means of the respective selector lips closes the desired circuits of said circuit rings.

The selector knobs 54 and the selector lip assemblies 50 are disposed in a circle around the central shaft 18 and arbor 18b, and are placed in positions corresponding to time indications on the clock face 23. The drawings illustrate twenty-four selector switches 50 placed around the clock, which are adapted to control operational functions at half-hour intervals. The present device is not limited to the time periods indicated but may be varied by adding or subtracting the number of selector switches disposed about the central arbor. Also the number of circuit rings may be increased or decreased depending upon the number of circuits and apparatus that it is desired to control. If additional banks of circuit rings together with the appropriate insulator rings are added then the selector lip switch must be modified so that there are an increased number of selector lips to cooperate with the increased number of corresponding circuit rings as the switches are turned on their axes. Also the number of corresponding contact buttons 64 must be varied to correspond with such changes. In some applications only one circuit ring may be required in which case the seluector switch would have only one selector lip.

The multiposition selector lip assembly 50 as shown has four selector lips 61 which are staggered longitudinally to correspond with the positions of each of the four circuit rings 37. The selector lips are also shown staggered radially at forty-five degrees from each other so that when the selector assembly is turned forty-five degrees by knob 54 a selector lip 61 comes into contact with spring clip 37, for example. As the knob 54 is turned another forty-five degrees, the first selector lip is removed from its corresponding spring clip and another selector lip member establishes contact with its corresponding spring contact 37 which is electrically integral with the circuit ring of which it is a part. Each circuit ring is separately conected by way of wires 98, 99, 100 or 101 to a circuit or relay which it is desired to control. If it is desired not to operate a certain controllable function at a certain time, the corresponding selector lip assembly 50 at that time position may remain in the off position as shown in the selector switches in the first quadrant of the apparatus in Figure 1.

The twenty-four selector assemblies 50 shown in Figure 1 are placed around the clock face at half-hour intervals. The selector switch 50 at the 12 o'clock position is in the off position. The 11:30 switch is in the first contact position, the 11:00 o'clock switch is in the second contact position, the 10:30 o'clock switch is in the third contact position, the 10:00 o'clock switch is in the first contact position, and the 9:30 o'clock switch is in the fourth contact position. These various circuit positions can be preselected manually in accordance with a predetermined program of functions at various time intervals around the clock before said circuits are closed.

The closing of the hereinabove described preselected circuits is accomplished by the revolution of the sweep arm member 68 which is coordinated with the movement of the hour hand 20, making one revolution each twelve hours. In Figure 1, the hour hand 20 is shown at the 6:00 o'clock position while the sweep arm member 68 is shown at the 12:00 o'clock position. This apparent discrepancy is necessitated by the exigencies of clarity of illustration, but in actual operation the hour hand and the sweep member will be aligned in approximately the same angular direction except that the actual alignment must be made between the hour hand and the position of snap-action member 73. According to Figure 1, snap action contact 73 is wiping control button 64 which is in electrical connection with the 11:30 o'clock switch 60; and in actual operation the clock hands 20 and 21 would be in the time interval between 11:30 o'clock to 12 o'clock.

The sweep arm member 68 maintains continuous contact with circuit contact ring 62 by means of contact blade 72. Circuit contact ring 62 is in circuit connection with the power line lead 96 through screw-member 97. Contact blade member 72 is electrically connected with leg blade member 73 by means of plate 71. As sweep arm 68 is driven radially by the motor 14 through shaft 18, the contact blade member 73 is swept around radially and impinges successively on contact buttons 64. Each of said contact buttons 64 is electrically connected to corresponding selector lip assemblies 50 by means of plates 65. As contact blade 73 impinges upon a contact button corresponding with a time position on the clock a circuit is closed in accordance with the preselected position of the selector switch 50 which has previously been set to establish a circuit relationship with a circuit ring 30, 31, 32 or 33.

Flexible snap action spring blade or wire 73 is adjusted upon sweep arm 68 as regards length and tension so that as said blade passes from one contact button 64 to another, it snaps across the space between said electrically conducting buttons practically instantaneously so that no appreciable time lag is apparent between successive time stations. The contact buttons are positioned in a circle concentric with the shaft 18 and are spaced equidistant from each other and at such positions accurately to correspond with the positions of time intervals on the clock face 23 to which the hour hand 20 points.

The selector lip switch 50 which is illustrated as a series of press-fitted cups may alternatively be made of a single piece of conductive metal having contact lips corresponding to lips 61, 61a, 61b and 61c placed in the proper selecting positions by machining or casting. Such a cast or machined piece may have integral shafts instead of separable shafts 51 and 52 as illustrated. The selector switch means may also be made of a rod with press-fitted washers having selector lips for contacting the circuit rings.

The circuit rings 30a and 30b may alternatively be made of, or consolidated into, a single piece of conductive metal having tabs which are capable of being stamped or shaped into contact elements corresponding to contact elements 37 for making electrical connection with selector lips 61, etc.

Instead of leading current in by means of the circuit contact ring 62, current may alternatively be introduced, properly insulated, through shaft 18, through contact arm 68 and out to contact spring member 73. Also if current is led in through or over shaft 18 to arm 68, said arm may consist wholly of a contact spring adapted to contact by snap action successive time buttons or switches.

Predetermined programs may be arranged on a twelve hour cycle on the basis of the herein described device. My present invention is not limited to a twelve hour cycle but may be adapted to any time cycle desired by appropriate changes in gearing and in the number of selector switches. As the sweep arm 68 revolves in a clock wise direction it establishes predetermined circuits at regular time intervals, said circuits being set to control various functions such as relay operations, machine operations on a time sequence basis, lighting sequences, heat cycles and radio tuning. In particular reference to the latter it may be desired to set up automatic tuning of four radio stations, for example, A, B, C and D, which stations are tunable by means of relays and trimmer condensers. Each of the four relays corresponding to radio stations A, B, C and D are connected through cable 103 and lead wires 98, 99, 100 and 101 to the circuit rings 30, 31, 32 and 33 respectively, which are selected by turning knob 54 to positions 92, 93, 94 or 95. Depending upon the position to which the knob 54 is turned, the revolving sweep arm 68 and spring contact blade 73 will bring the corresponding relay into circuit and automatically tune the corresponding station.

The shut off arm 82 is positioned on shaft 18 in relation to the contacting position of contact blade 73 so that after said blade has passed to a subsequent contact button 64, said shut off arm follows soon after and operates to turn the selector switch 50 to the open circuit position, whereby the circuit is broken between the selector switch and the circuit ring.

In some applications it may be desired to make the present preselection device without the automatic shut off means as actuated by sweep arm 82 and shut off knobs 74. In that case, when the time cycle of each selector switch 50 has elapsed, its corresponding knob 54 may be turned manually to the off position or to another desired position for actuation when the sweep arm 68 completes its rotation and continues the subsequent revolution.

The arrangement of the brush contact spring 73 on the sweep arm 68 in cooperation with contact buttons 64 can be varied by setting up a circle of contacts of any suitable type concentric with the rotation of said sweep arm and by changing leg 73 to a contact finger which is attached to said sweep arm in longitudinal alignment with it. Alternatively such a contact finger can be adapted to impinge directly upon the arbors of the selector switches. Thus any arrangement whereby a timer contact driven by a timing mechanism successively establishes electrical connection with a circular series of separate contacts or switches with a minimum of time lapse between contacts is contemplated by the present invention.

Figure 5 is a schematic equivalent circuit diagram of the present invention where current is led into a circuit contact ring 62, passes through timer contact 71, through time contact button 64 to the four pole selector switch 50. Each of the four poles of the selector switch is capable of making contact with its corresponding circuit ring 30, 31, 32 or 33 which in turn is connected with the circuit it is desired to control such as, for example, a relay assembly 105.

The apparatus of the present invention can be modified to comprise a larger number of banked circuit ring discs 30, 31, 32 and 33 than that shown in the drawing. If the number of said circuit rings is increased, the number of selector lips 61 must be increased correspondingly and arranged on the selector switch 50 so as properly to be coordinated with said circuit rings. Also the indexing means must be modified to accommodate the greater number of indexing positions required.

If it is desired to control a plurality of circuits simultaneously by the mechanism of the present invention it is possible to set two or more selector lips 61, etc. in the same relative position on the selector switch 50 so that upon turning of selector knob 54, said selector lips simultaneously contact their respective circuit rings. Certain lighting systems and industrial controls often require the simultaneous functioning of certain electric circuits according to a time pattern and the machine of the present invention provides for a simple, novel and inexpensive accomplishment of that result. The device of the present invention provides for a flexible automatic preselector of radio programs which not only is extremely versatile but also provides, if desired, for automatic shut-off of the preselector switches after the time period of the selected program elapses.

While the present invention, as to its objects and advantages has been described herein as carried out in specific embodiments thereof, it is not desired to be limited thereby but it is intended to cover the invention broadly within the spirit and scope of the appended claims.

I claim:

1. A time control device which comprises a time drive mechanism, an arbor driven by said time mechanism, an arm carried by said arbor, a plurality of circuit rings arranged concentrically about said arbor, a plurality of rotatable selecting means for contacting said circuit rings, contact means on said arm to successively establish contact with said selecting means.

2. A time control preselection device which comprises a time drive mechanism, an arbor driven by said time mechanism, an arm carried by said arbor, a plurality of circuit rings arranged concentrically about said arbor, a plurality of multiposition switches each adapted to selectively contact said circuit rings, a circuit contact ring, brush contact means on said arm to contact said circuit contact ring, and snap action contact means in electrical contact with said brush contact means to establish contact successively with said switches.

3. A time control device which comprises a time drive mechanism, a rotatable arbor driven by said time mechanism, an arm carried by said arbor, a plurality of circuit rings arranged concentrically and in tandem about said arbor, a plurality of multiposition switches each adapted to contact said circuit rings, a plurality of contacts in circuit connection with said switches, said contacts being arranged concentrically around said arbor, a circuit contact ring arranged concentrically around said arbor, contact means on said arm adapted to maintain electrical contact with said circuit contact ring, snap action contact means on said arm in electrical connection with the first contact means and adapted to establish contact successively with said contacts.

4. A time control device which comprises a time drive mechanism, a rotatable arbor driven by said time mechanism, an arm carried by said arbor, a plurality of circuit rings arranged concentrically and in tandem about said arbor, a plurality of rotatable multiposition switches, each of said switches having contact lips arranged in a staggered pattern radially and in tandem as to contact selectively said circuit rings when said switch is turned on its axis, a plurality of contact buttons in circuit connection with said switches, said contact buttons being arranged concentrically around said arbor, a circuit contact ring arranged concentrically around said arbor, brush contact means on said arm adapted to maintain electrical contact with said circuit contact ring, snap action contact means on said arm in electrical connection with said brush contact means and adapted to establish contact successively with said contact buttons.

5. A preselection time electrical control device which comprises a rotatable arbor, an arm carried by said arbor, a plurality of circuit rings arranged concentrically about said arbor, a plurality of switch means each adapted selectively to contact said circuit rings, contact means on said arm adapted to establish contact successively with said switch means.

6. An electrical control device which comprises a rotatable arbor, an arm carried by said arbor, a plurality of circuit rings arranged in tandem concentrically around said arbor, a plurality of rotatable multiposition switch means, a plurality of contact lips arranged on said switch means in a staggered pattern both radially and longitudinally in relation to the axis of said switch means, said contact lips being adapted to establish contact with respective circuit rings upon the rotation of said switch means, a plurality of contact buttons in circuit connection with said switch means, and contact means on said arm adapted to establish electrical contact with said contact buttons.

7. An electrical control device which comprises an arbor, an arm carried by said arbor, a plurality of circuit rings arranged in tandem concentrically around said arbor, a plurality of rotatable multiposition switch means, a plurality of contact lips arranged on each of said switch means in a staggered pattern both radially and longitudinally in relation to the axis of said switch means said contact lips being adapted selectively to establish contact with respective circuit rings upon the rotation of said switch means, a plurality of contact buttons in circuit connection with said switch means, a circuit ring, contact means on said arm to maintain electrical contact with said circuit contact ring, snap action contact means on said arm adapted to establish contact successively with said contact buttons and an electrical connector between said first contact means and said snap action contact means.

8. A time control device which comprises a time drive mechanism, a rotatable arbor driven by said drive mechanism, an arm carried by said arbor, a plurality of circuit rings arranged in tandem concentrically around said arbor, a plurality of rotatable multiposition switch means, a plurality of contact lips arranged on said switch means in a staggered pattern both radially and longitudinally in relation to the axis of said switch means, said contact lips being adapted to establish contact with respective circuit rings upon the rotation of said switch means, a plurality of contact buttons in circuit connection with said switch means, a circuit contact ring, contact means on said arm to maintain electrical contact with said circuit contact ring, snap action contact means on said arm adapted to contact successively said contact buttons and an electrical connector between said first contact means and said snap action contact means.

9. A preselection time control device which comprises a rotatable arbor, an arm carried by said arbor, a plurality of circuit rings, disposed concentrically about said arbor, a plurality of multiposition switch means each adapted selectively to contact said circuit ring, said switch means being arranged about said circuit ring in a time interval pattern, and contact means on said arm adapted to establish contact successively with said switch means.

10. A time control device which comprises a time drive mechanism, a rotatable arbor driven by said time mechanism, an arm carried by said arbor, a plurality of circuit rings arranged concentrically about said arbor, a plurality of rotatable selecting means for selectively contacting said circuit rings, said selecting means being arranged about said circuit rings in a time interval pattern, contact means on said arm to successively establish contact with said selecting means.

11. A time control device which comprises a time drive mechanism, a rotatable arbor driven by said time mechanism, an arm carried by said arbor, a plurality of circuit rings arranged concentrically and in tandem about said arbor, a plurality of multiposition switches each adapted selectively to contact said circuit rings, a plurality of contacts in circuit connection with said contacts being arranged concentrically around said arbor, said contacts being arranged about said arbor in a time interval pattern, a circuit contact ring arranged concentrically around said arbor, contact means on said arm adapted to maintain electrical contact with said circuit contact ring, and snap action contact means in electrical connection with the first contact means and adapted to establish contact successively with said contacts.

12. A time control device which comprises a time drive mechanism, a rotatable arbor driven by said time mechanism, an arm carried by said arbor, a plurality of circuit rings arranged concentrically and in tandem about said arbor, a plurality of multiposition switches each adapted selectively to contact said circuit rings, a plurality of contact buttons in circuit connection with said switches, said contact buttons being arranged concentrically and in a time interval pattern around said arbor, a circuit contact ring arranged concentrically around said arbor, brush contact means on said arm adapted to maintain electrical contact with said circuit contact ring, and snap action contact means in electrical connection with said brush contact means and adapted to establish contact successively with said contact buttons.

13. A time control device which comprises a time drive mechanism, a rotatable arbor driven by said time mechanism, an arm carried by said arbor, a plurality of circuit rings arranged concentrically and in tandem about said arbor, a plurality of multiposition switches each adapted selectively to contact said circuit rings, a plurality of contact buttons in circuit connection with said switches, said contact buttons being arranged concentrically around said arbor, a circuit contact ring arranged concentrically around said arbor, brush contact means on said arm adapted to maintain electrical contact with said circuit contact ring, snap action contact means in electrical connection with said brush contact means and adapted to establish contact successively with said contact buttons, and shut-off means on said arbor adapted to break the circuit between said switches and said circuit rings.

14. A time control device which comprises a time drive mechanism, a rotatable arbor driven by said time mechanism, an arm carried by said arbor, a plurality of circuit rings arranged concentrically and in tandem about said arbor, a plurality of multiposition switches each adapted selectively to contact said circuit rings, a plurality of contacts in circuit connection with said switches, said contacts being arranged concentrically around said arbor, said contacts being arranged about said arbor in a time interval pattern, a circuit contact ring arranged concentrically around said arbor, contact means on said arm adapted to maintain electrical contact with said circuit contact ring, snap action contact means in electrical connection with the first contact means and adapted to establish contact successively with said contacts, and shut-off means on said arbor adapted to break the circuit between said switches and said circuit rings.

15. A time control device which comprises a time drive mechanism, an arbor driven by said time mechanism, an arm carried by said arbor, a plurality of circuit rings arranged concentrically about said arbor, a plurality of rotatable selecting means for contacting said circuit rings, contact means on said arm to successively establish contact with said selecting means, and a shut-off arm on said arbor adapted to turn said selecting means to the open circuit position.

16. A time control device which comprises a time drive mechanism, a rotatable arbor driven by said time mechanism, an arm carried by said arbor, a plurality of circuit rings arranged concentrically and in tandem about said arbor, a plurality of rotatable multiposition switches each adapted selectively to contact said circuit rings, a plurality of contacts in circuit connection with said switches, said contacts being arranged concentrically around said arbor, a circuit contact ring arranged concentrically around said arbor, contact means on said arm adapted to maintain electrical contact with said circuit contact ring, snap action contact means on said arm in electrical connection with the first contact means and adapted to establish contact successively with said contacts, and a shut-off member on said arbor adapted to turn said switches to the open circuit position.

17. A time control device which comprises a time drive mechanism, a rotatable arbor driven by said time mechanism, an arm carried by said arbor, a plurality of circuit rings arranged concentrically and in tandem about said arbor, a plurality of multiposition switches adapted to contact said circuit rings, said multiposition switches comprising an assembly of contact cups, each of said cups having a contact lip adapted to cooperate with a corresponding circuit ring, a plurality of contacts in circuit connection with said switches, said contacts being arranged concentrically around said arbor, a circuit contact ring arranged concentrically around said arbor, contact means on said arm adapted to maintain electrical contact with said circuit contact ring, snap action contact means in electrical connection with the first contact means and adapted to establish contact successively with said contacts, and a shut-off member on said arbor adapted to turn said switches to the open circuit position.

18. A time control device which comprises a time drive mechanism, a rotatable arbor driven by said drive mechanism, an arm carried by said arbor, a plurality of circuit rings arranged in tandem concentrically around said arbor, a plurality of rotatable multiposition switch means, a plurality of contact lips arranged on said switch means in a staggered pattern both radially and longitudinally in relation to the axes of said switch means, said contact lips being adapted to establish contact with respective circuit rings upon the rotation of said switch means, a plurality of contact buttons in circuit connection with said switch means, said buttons being arranged about said arbor in a time interval pattern, a circuit contact ring, contact means on said arm to maintain electrical contact with said circuit contact ring, snap action contact means on said arm adapted to establish contact successively with said contact buttons, an electrical connector between said contact means and said snap action contact means and a shut-off member on said arbor adapted to turn said switches to the open circuit position.

19. A time control device which comprises a time drive mechanism, a rotatable arbor driven by said time mechanism, an arm carried by said arbor, a plurality of circuit rings arranged concentrically and in tandem about said arbor, a plurality of multiposition switches adapted to contact said circuit rings, indexing means on said switches adapted to position said switches in contacting relation to said circuit rings, a plurality of contacts in circuit connection with said switches, said contacts being arranged concentrically around said arbor, said contacts being arranged about said arbor in a time interval pattern, a circuit contact ring arranged concentrically around said arbor, contact means on said arm adapted to maintain electrical contact with said circuit contact ring, and snap action contact means in electrical connection with the first contact means and adapted to establish contact successively with said contacts, and a shut-off member on said arbor adapted to turn said switches to the open circuit position.

20. An electrical control device which comprises a rotatable arbor, an arm carried by said arbor, a plurality of circuit rings arranged in tandem concentrically around said arbor, a plurality of rotatable multiposition switch means, knobs on said switches, recesses in said knobs, spring means adapted to cooperate with said recesses to position said switches, a plurality of contact lips arranged on said switch means in a staggered pattern both radially and longitudinally in relation to the axes of said switch means, said contact lips being adapted to establish contact with respective circuit rings upon the rotation of said switch means, contact means on said arm to establish electrical contact with said switch means, and a shut-off arm on said arbor adapted to rotate said knobs whereby said switch means are turned to the open circuit position.

21. A time control device which comprises a time drive mechanism, a rotatable arbor driven by said time mechanism, an arm carried by said arbor, a plurality of circuit rings arranged concentrically and in tandem about said arbor, a plurality of multiposition switches adapted to contact said circuit rings, knobs on said switches, recesses in said knobs, spring means adapted to cooperate with said recesses to position said switches, said circuit rings having contact means disposed radially about said rings and adapted to cooperate with said switches, a plurality of contacts in circuit connection with said switches, said contacts being arranged concentrically around said arbor, a circuit contact ring arranged around said arbor, contact means on said arm adapted to maintain electrical contact with said circuit contact ring, snap action contact means in electrical connection with the first contact means and adapted to establish contact successively with said contacts, and a shut-off member on said arbor adapted to rotate said knobs whereby said switches are turned to the open circuit position.

22. A time control device which comprises a time drive mechanism, a rotatable arbor driven by said mechanism, an arm carried by said arbor, a plurality of circuit rings separated by insulation and arranged in tandem concentrically around said arbor, a plurality of rotatable multiposition switches, indexing means to position said switches, a plurality of contact lips arranged on said switch means in a staggered pattern both radially and longitudinally in relation to the axis of said switch means, said contact lips being adapted to establish contact with respective circuit rings upon the rotation of said switch means, a plurality of contact buttons in circuit connection with said switch means, a circuit contact ring, contact means on said arm to maintain electrical contact with said circuit contact ring, snap action contact means on said arm in electrical connection with said first contact means and adapted to establish contact successively with said contact buttons, and a shut-off arm on said arbor adapted to rotate said switches to the open circuit position, said shut-off arm having cam means for releasing said indexing means.

23. A time control device which comprises a time drive mechanism, a rotatable arbor driven by said drive mechanism, an arm carried by said arbor, a plurality of circuit rings arranged in tandem concentrically around said arbor, a plurality of rotatable multiposition switch means, knobs on said switches, recesses on said knobs, spring means adapted to cooperate with said recesses to position said switches, a plurality of contact lip arranged on said switch means in a staggered pattern both radially and longitudinally in relation to the axes of said switch means, said contact lips being adapted to establish contact with respective circuit rings upon the rotation of said switch means, a plurality of contact buttons in circuit connection with said switch means, said buttons being arranged about said arbor in a time interval pattern, a circuit contact ring, contact means on said arm to maintain electrical contact with said circuit contact ring, snap action contact means on said arm in electrical connection with said contact means and adapted to establish contact successively with said contact buttons and a shut-off arm on said arbor adapted to rotate said switches to the open circuit position, said shut-off arm having cams means for depressing said spring means whereby the amount of friction that is required to rotate said switches is reduced.

CLARENCE GRAHAM MONTGOMERY.

REFERENCES CITED

The following references are of record in the file of this patent:

UNITED STATES PATENTS

| Number | Name | Date |
| --- | --- | --- |
| 2,385,840 | Owens | Oct. 2, 1945 |

FOREIGN PATENTS

| Number | Country | Date |
| --- | --- | --- |
| 104,594 | Australia | July 28, 1938 |